April 17, 1934.    R. J. MINSHALL ET AL    1,955,142
SHOCK ABSORBING LANDING GEAR
Filed April 6, 1932    3 Sheets-Sheet 3
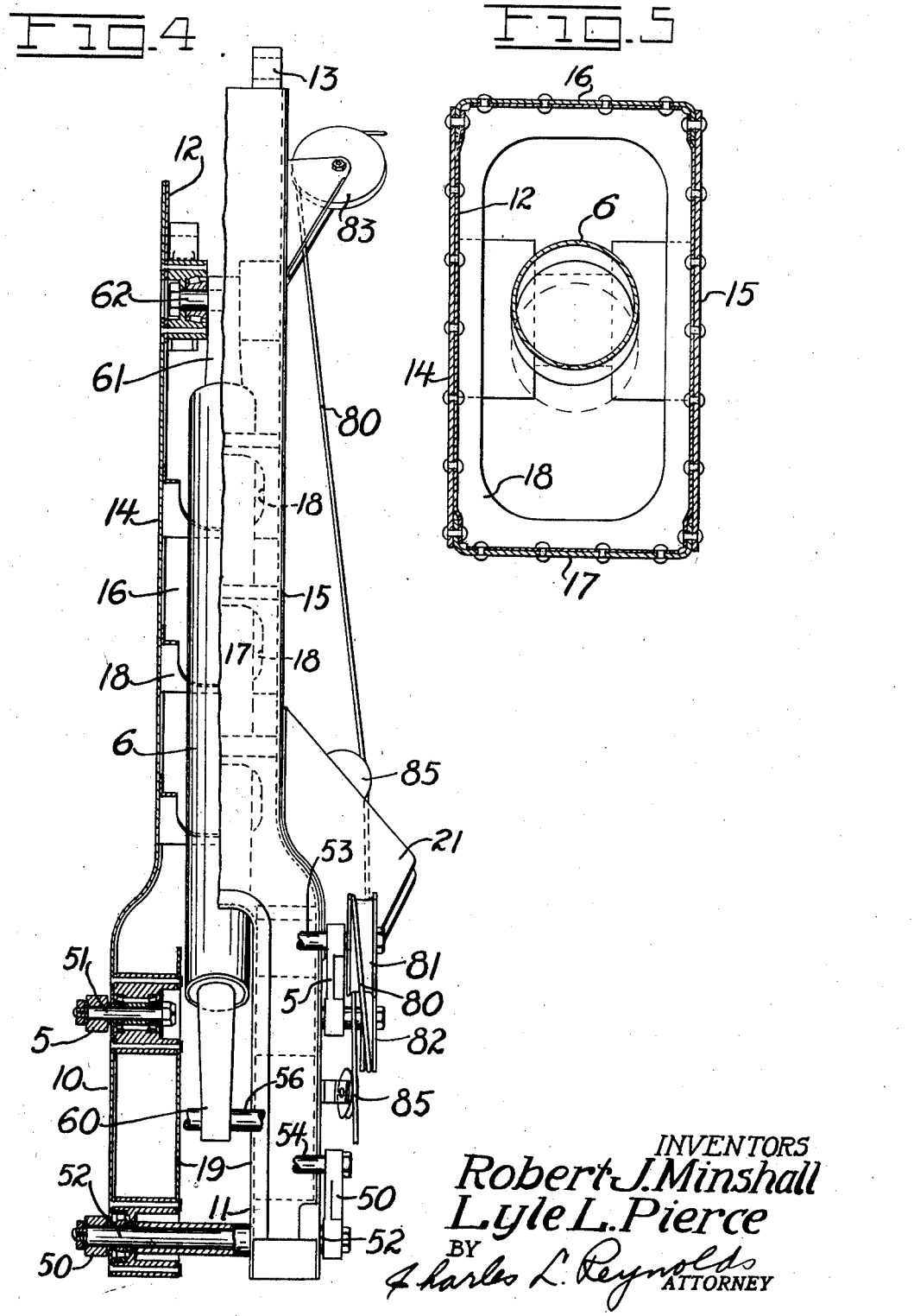
INVENTORS
Robert J. Minshall
Lyle L. Pierce
BY
Charles L. Reynolds
ATTORNEY Patented Apr. 17, 1934

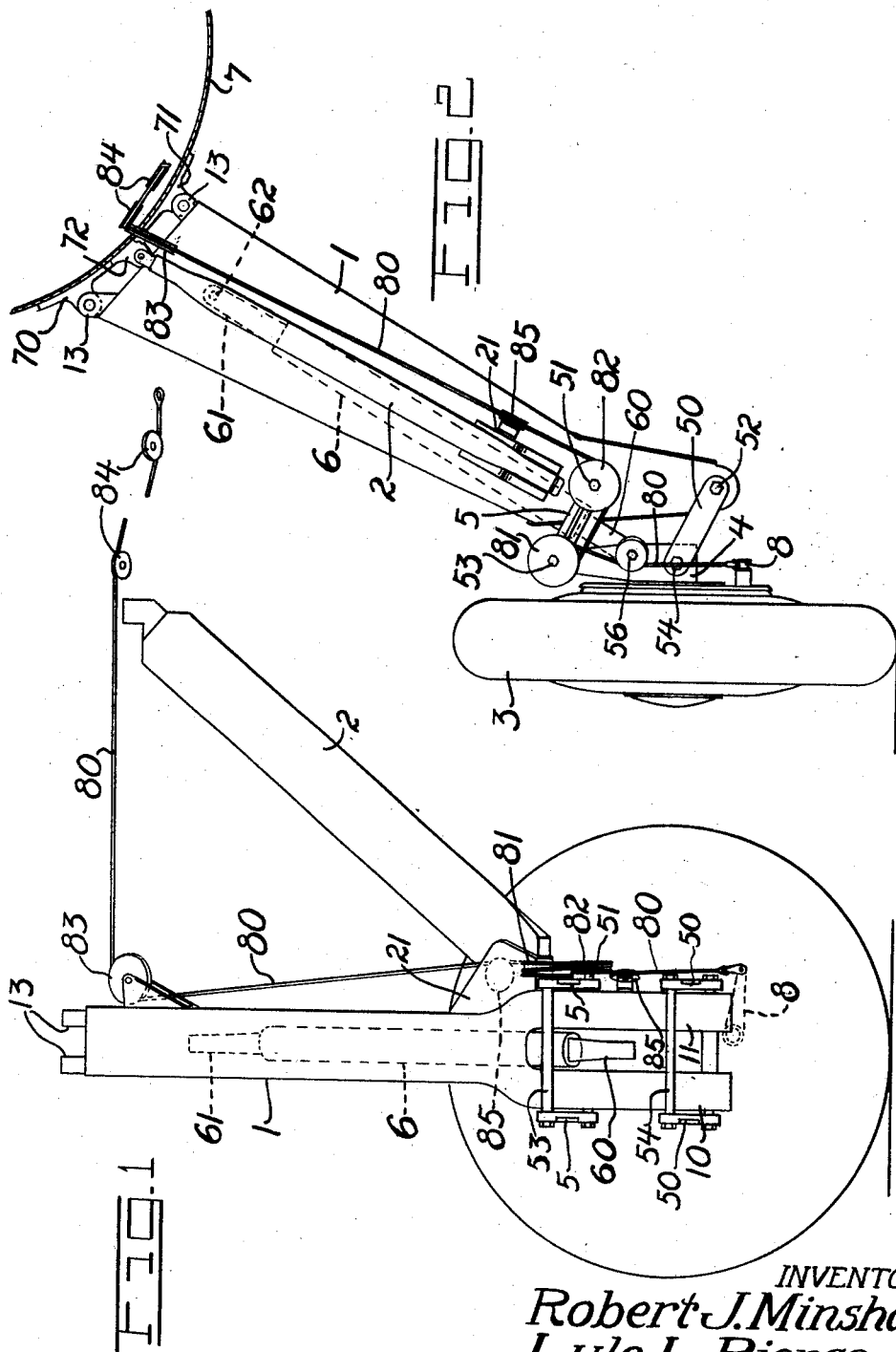

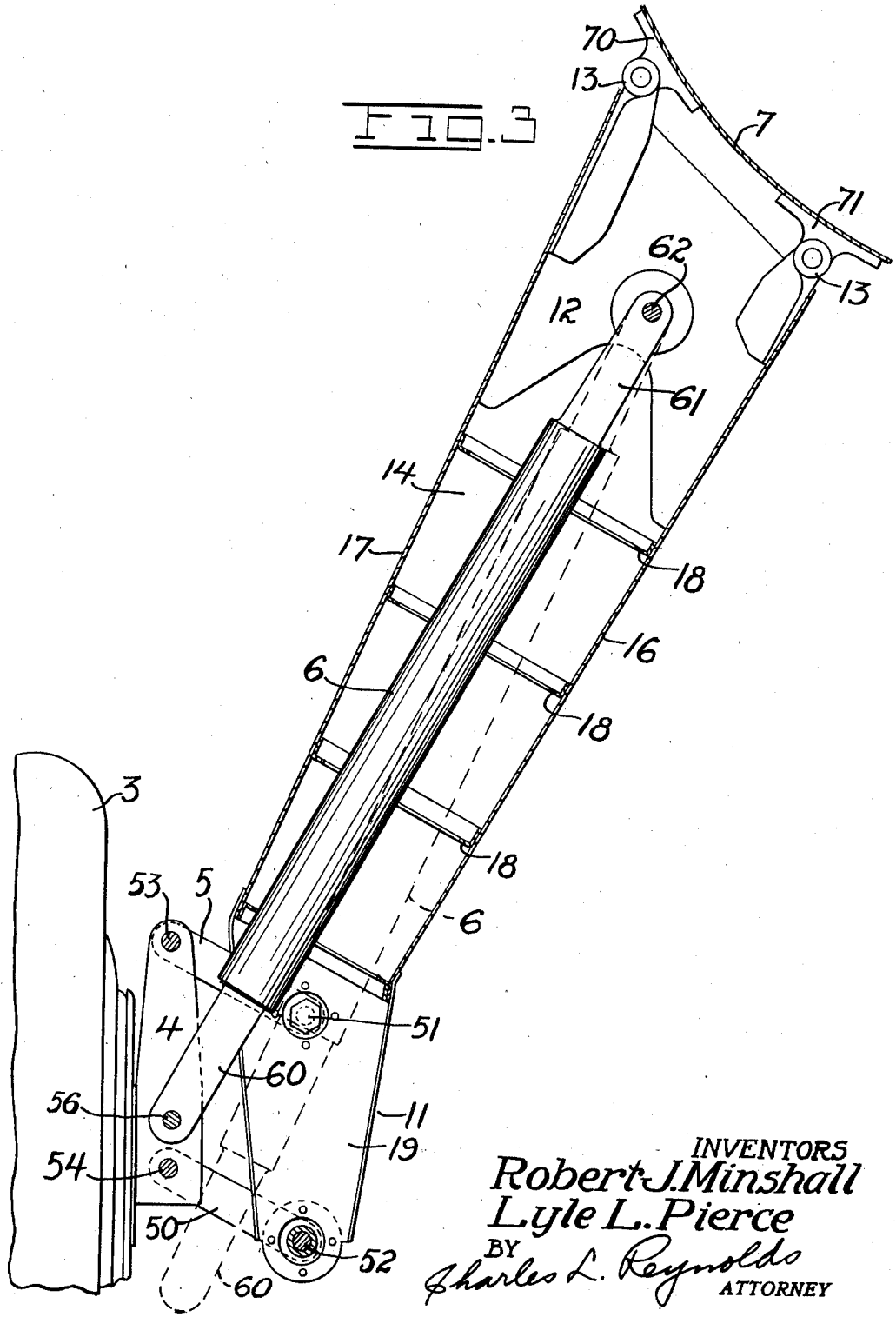

1,955,142

UNITED STATES PATENT OFFICE 1,955,142

SHOCK ABSORBING LANDING GEAR

Robert J. Minshall and Lyle L. Pierce, Seattle, Wash., assignors to Boeing Airplane Company, Seattle, Wash., a corporation of Washington Application April 6, 1932, Serial No. 603,533

14 Claims. (Cl. 244—2)

Our invention relates to the landing gear of aircraft and to a shock absorbing means designed to be incorporated therein. It pertains also to the means for operating the brake upon a wheel movable relative to the body or fuselage whereon is mounted the control for the brake, in such manner that the movement of the wheel under stresses of landing or taxiing will not in any way interfere with the brake connections, and vice versa.

It is one object of our invention to provide a landing gear with a rigid leg, thus eliminating the necessity for transverse bracing. It is also an object to incorporate in such a rigid leg a shock absorbing element such as the conventional oleo unit, and so to mount the wheel (or ski) that it is yieldable and movable relative to the leg while the leg itself remains fixed and rigid.

By the provisions above it is possible to accomplish a further object, to render the entire landing gear compact, and to eliminate bracing members and external portions of the landing gear which induce head resistance, and thus to lower the head resistance of the landing gear as a whole.

It is a further object to devise a special connection between the brake control upon the fuselage and the brake upon the wheel.

It is also an object to devise a mounting for a landing wheel, by means of which the up and down movement of the wheel or ski in landing and taxiing will be always through parallel positions, so that, if the wheel is intended to be in a vertical plane, it will always remain in a vertical plane between its limits of movement.

It is an object to devise a landing gear incorporating a rigid leg which will be simple and strong in construction, yet light in weight, and one which can be easily applied to the airplane or detached as a unit.

These and other objects will be understood from a study of the accompanying drawings, wherein our invention is shown embodied in a form which at present is preferred by us, of this specification, and of the claims which terminate the same.

Our invention comprises the novel parts, and the novel combination and arrangement thereof, as shown in the accompanying drawings, described in the specification, and as will be more particularly defined by the claims at the end of this specification.

Figure 1 is a side elevation of the landing leg and associated parts, the position only of the wheel being indicated.

Figure 2 is a rear elevation of the landing gear as a whole, the extreme upper limit of movement being shown.

Figure 3 is a transverse vertical section through the landing leg, the shock absorber and wheel and associated parts being shown in elevation.

Figure 4 is in part a side elevation and in part a longitudinal section through the landing leg and parts directly associated therewith.

Figure 5 is a transverse section through the landing leg.

The landing gear comprises a rigid, unitary, and preferably hollow leg, generally designated at 1, and terminating at its lower end in a fork, the parts of which are indicated at 10 and 11. Connected to the rigid leg is a drag strut 2. A ground-engaging device, typified by the wheel 3, is mounted upon a spindle body, generally designated by the numeral 4, and is supported from the lower end of the leg for movement relative thereto, preferably by parallel motion means such as the two equal parallel links 5 and 50, and a shock absorber 6 is associated with the spindle body and with the leg, and preferably is disposed within the hollow leg. Its lower end 60 is connected to the wheel or, more correctly speaking, to the spindle body 4 which supports the wheel, and projects from the leg between the furcations 10 and 11. The upper part 61 which telescopes with relation to the lower portion 60 has a bearing at 62 within the upper part of the leg 1.

The upper part of the leg is suitably reinforced, as is indicated at 12, and ears 13 are disposed to register with lugs 70 and 71 upon the fuselage 7 to position and support the leg. A similar lug 72 engages the upper end of the drag strut 2. The lower end of the drag strut may be received within a saddle 21 upon the rear side of the leg 1, preferably at the base of the furcations 10 and 11, hence bracing these furcations and applying the bracing effect of the drag strut at the point where it is most effective. The leg may be built up of a forward plate 14, a rear plate 15, an inside plate 16, and an outside plate 17, all secured together to form a hollow column, and internally braced, in addition to the reinforcing at 12, by transverse centrally apertured plates in the nature of bulkheads, indicated at 18. The inner and outer plates 16 and 17 respectively are shaped to form the furcations 10 and 11, and the inside of these furcations may be additionally strengthened by the plates 19. The construction just described forms a strongly braced rigid leg which is yet entirely self contained, and which can be handled as a unit.

It is ordinarily intended that the leg shall extend at an angle downwardly and outwardly from the fuselage, but the lower portion—that which forms the furcations 10 and 11—preferably is disposed at an angle to the general direction of the leg, as may be seen in Figures 2 and 3. To this angled downward extension of the leg are pivotally secured the parallel links 5 and 50 at the points 51 and 52, respectively. At these points suitable anti-friction bearings may be incorporated in the leg structure, so that the links may work freely, and as will be apparent, two pairs of parallel links are employed, one at the front and one at the rear of the leg extension. These links are pivoted in turn at the points 53 and 54 upon the spindle body 4, so that the normal vertical plane of this spindle body is maintained throughout all its positions.

Connected to the spindle body 4, as indicated at the point 56, is the lower portion 60 of the shock absorber, and its upper end is connected, as will be remembered, at the point 62; anti-friction bearings may be provided at these points so that the shock absorber may oscillate freely within the limits imposed upon it by the shape and size of the leg and the design of the furcations. Because of the angular extension at the lower end of the leg and the relatively short parallel links, the shock absorber requires but limited oscillation to permit considerable vertical movement of the wheel swinging about the pivots 51 and 52, and between these limits of the wheel's movement the shock absorber is given considerable extension and contraction or telescoping effect.

With the construction described, the wheel moves from the position of extreme compression shown in the drawings to a position where the parallel links permit the point 54 to drop considerably below the point 52, yet the wheels are always held vertical, ready for engagement with the earth upon landing. Compression of the shock absorber is suitably resisted internally of the oleo unit, as is customary, until the wheel reaches the extreme compression position shown in the drawings, and during taxiing may vary within these limits. To replace a damaged leg, or to permit inspection, servicing, adjustment, and repair of the leg, brake, oleo unit, or associated parts, the entire leg may be removed by removing the pins holding the lugs 70 and ears 13 together, and by disconnecting the drag strut.

It is customary to employ brakes in connection with landing gear, and mechanical brake-operating means appear to be most dependable. A brake-operating lever is indicated at 8, this being mounted upon the spindle body 4. By pulling on this brake lever 8, the brake is set, and in order to be able to operate the brake at all times without its operation being affected by the position of the wheel relative to the leg, and without affecting the freedom of movement of the wheel by any restriction placed upon it by the brake-operating means, I have employed a cable 80 extending from the brake-operating lever about a pulley 81 mounted at the axis 53 at the outer end of the upper parallel link 5, thence extending around a pulley 82 at the inner end of the same link, thence about a pulley 83 at the upper end of the leg, and thence by suitable guide pulleys 84 to a point upon the fuselage where it is within control of the pilot. Additional guide pulleys 85 may be employed upon the leg as may be found necessary to change its direction or to restrain it. Thus the brake cable is never tensioned nor slackened by swinging of the parallel links, nor does a pull upon the cable tend to move the wheel relative to the leg.

All parts of the landing gear, as thus described, are substantially in line in a fore and aft direction, and are compact. Thus head resistance is cut down and cross bracing and the attendant head resistance which the same entails is completely eliminated. The leg, drag strut, and all associated parts would normally be encased in pants.

While we have shown the lugs 70, 71 and 72 as mounted directly upon the fuselage 7, it is obvious that they might be supported upon some part of a retractable landing gear so that the entire landing gear may be pulled up and retracted while in flight, as the designer may wish.

What we claim as our invention is:

1. Airplane landing gear comprising a rigid leg, a landing wheel, means directly supporting said wheel from the leg and enabling up and down movement of the wheel relative to the leg, and an oleo unit structurally independent of said supporting means and said leg, and disposed within the leg, and damping such movement of the wheel.

2. Airplane landing gear comprising a rigid hollow leg, a landing wheel, wheel supporting means carried by the lower end of the leg and permitting movement of the wheel relative to the leg, and an oleo unit structurally independent of said supporting means and said leg, and extending from a connection to the wheel through the leg, and bearing in the upper portion of said leg, and movable relatively to the leg to check movement of the wheel in landing.

3. Airplane landing gear comprising a rigid leg adapted to be angularly disposed, and having a substantially vertical lower extension, a landing wheel, parallel motion means supporting the wheel from said extension, and an oleo shock absorbing unit independent of the leg and extending from the wheel through the leg to a bearing in the upper part of the leg, to check movement of the wheel.

4. Airplane landing gear comprising a rigid hollow leg adapted to be angularly disposed, a landing wheel, parallel links supporting the wheel from the lower end of the leg, and an oleo shock absorber pivotally connected at its lower end to the immediate support of the wheel, extending through the leg, and pivotally connected at its upper end to the leg to move relatively thereto.

5. Airplane landing gear comprising a rigid hollow leg adapted to be angularly disposed, and having a substantially vertical downward extension at its lower end, a landing wheel, parallel links supporting the wheel from the extension, a telescoping oleo unit pivotally connected at its upper end to the leg, and extending through the leg to a pivotal connection between its lower end and the immediate support of the wheel.

6. In airplane landing gear, in combination with a leg, a landing wheel, parallel links supporting said wheel from the lower part of the leg, a brake associated with said wheel, a brake-operating cable extending from said brake to a distant control point upon the airplane, and a guide pulley therefor at each pivot of one of said parallel links.

7. In airplane landing gear, in combination with a rigid hollow leg, a landing wheel, parallel links supporting said wheel from the lower part of the leg, an oleo unit connected to the wheel and extending through the leg to a bearing at its upper end, a brake associated with said wheel, a brake-operating cable extending from said brake to a distant control point upon the airplane, and means guiding said cable to leave the oleo unit free play in all positions of the brake and brake-operating cable.

8. In airplane landing gear, a rigid, hollow, internally braced leg bifurcated at its lower end, a landing wheel, a spindle body supporting the wheel, parallel links supporting the spindle body from the lower end of the leg, and a telescoping oleo unit disposed within the leg, its upper end bearing in the upper portion thereof, and its lower end extending between the furcations of the leg and connecting to the spindle body.

9. In airplane landing gear, a rigid, hollow, internally braced leg bifurcated at its lower end, a landing wheel, a spindle body supporting the wheel, parallel links supporting the spindle body from the lower end of the leg, a telescoping oleo unit disposed within the leg, its upper end bearing in the upper portion thereof, and its lower end extending between the furcations of the leg and connecting to the spindle body, and a drag strut extending rearwardly, and connected to the leg at the base of the furcations.

10. A leg for airplane landing gear comprising a pair of spaced front and rear plates adapted to be disposed angularly and each having substantially vertical downward extensions at their lower ends, side plates joining the aforesaid plates above the extensions, the latter being spaced and braced to form a fork, and the leg thereabove being internally braced by transverse centrally apertured plates.

11. A leg for airplane landing gear comprising a pair of spaced front and rear plates adapted to be disposed angularly and each having substantially vertical downward extensions at their lower ends, side plates joining the aforesaid plates above the extensions, the latter being spaced and braced to form a fork, and the leg thereabove being internally braced by transverse centrally apertured plates, and reinforcing means in the upper portion of the leg adapted to form a bearing for an oleo unit, when received within the leg.

12. A hollow rigid leg for airplane landing gears, a landing device supported from and movable relative to its lower end, an oleo shock absorbing unit secured to and extending between the leg and the landing device, and contained wholly within the leg, and transversely spaced lugs upon the leg for direct securement to the fuselage of an airplane.

13. Airplane landing gear comprising a rigid leg adapted to be secured to an airplane structure, a landing wheel disposed at one side of said leg, means extending transversely from the leg to the wheel to support the latter for movement vertically relatively to the leg, and a shock absorbing unit structurally independent of the leg and wheel supporting means, and connected at its lower end to the latter, and extending thence upwardly in the longitudinal plane occupied by the leg to a connection at the upper end of the leg.

14. In an airplane landing gear, in combination with a leg, a landing wheel having a brake associated therewith, means supporting the wheel from the leg for arcuate movement relatively to the leg, a shock absorbing unit structurally independent of the leg and wheel-supporting means, and connected to each, and mechanical brake-operating means extending from a distant control point upon the airplane to the connection of the wheel and its support for arcuate movement, and thence to the brake upon the wheel.

ROBERT J. MINSHALL.
LYLE L. PIERCE.